Figure 1:
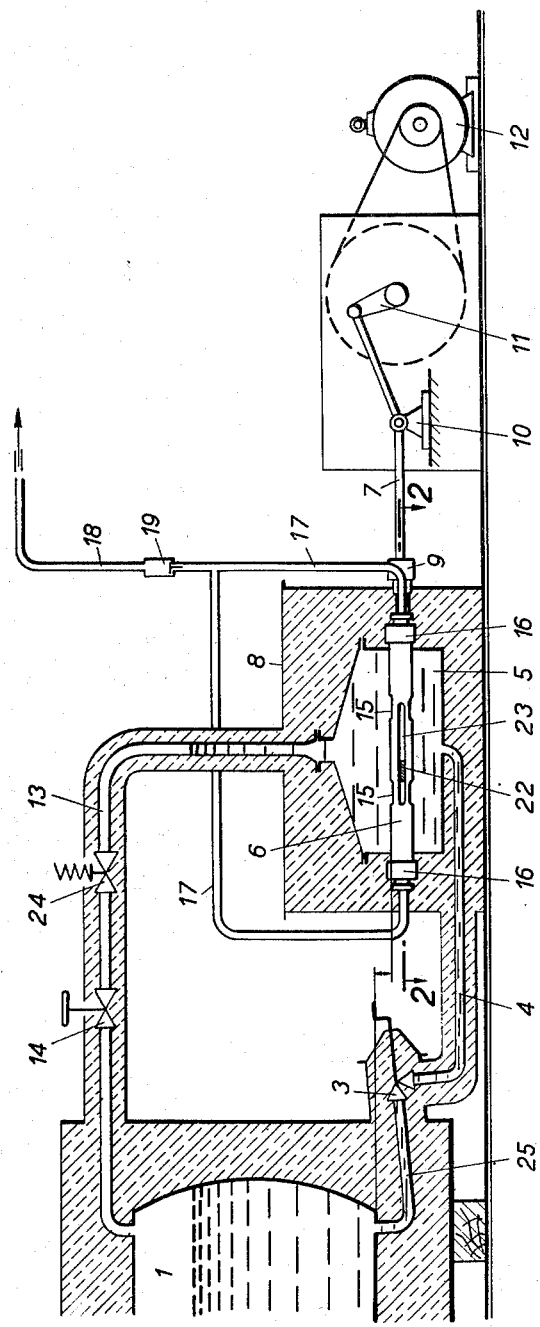

United States Patent Office 2,775,211
Patented Dec. 25, 1956

2,775,211

DOUBLE ACTION PUMPS

Alfred Lahoda, Munich, Germany, assignor to Gesellschaft fuer Linde's Eismaschinen Aktiengesellschaft, Hoellriegelskreuth, near Munich, Germany, a corporation of Germany Application May 20, 1952, Serial No. 288,913

Claims priority, application Germany June 11, 1951

2 Claims. (Cl. 103—175)

This invention relates to double action pumps for the transport of liquids and particularly of liquefied gases such as liquid oxygen and nitrogen.

Pumps of this type are used to transport the liquefied gases from storage vessels into low-pressure containers or for converting the same, for instance, in steel cylinders against high counter-pressure into the gaseous phase.

The customary high-pressure pumps are single action pumps for the simple reason to avoid the use of high-pressure packing glands. Indeed the difficulty of preserving the high-pressure packing boxes in the tight state is greatly increased by the unavoidable influence of low temperature, which produces solidification of the lubricants; if high-pressure oxygen is transported, high-pressure packing boxes cannot at all be used in view of the danger of explosion.

A further difficulty arises insofar as the piston rod of the pump while passing through one side of the cylinder wall takes up a large portion of the cylinder volume; consequently the transport capacity of this side of the cylinder does not compare with the difficulties resulting from the above described conditions with regard to the construction and operation of the pump.

Moreover, the piston rod while passing through the cylinder introduces into the same a large amount of heat, whereby a portion of the liquefied gas is vaporized and the volumetric efficiency greatly reduced.

The same disadvantage at a lesser degree is experienced in low pressure pumps and therefore extremely long piston rods are often used.

These long piston rods if directly connected with the piston have the great disadvantage that deviations from an ideal shape, which are unavoidable in the production of guide members, are greatly multiplied at the operative portion of the piston and due to the resulting one-sided pressure increase the danger of a canting of the piston in the cylinder.

These drawbacks are not minimized by a jointed connection of the piston rod with the piston.

The canting of the piston is particularly undesirable at a low temperature. Since lubricants cannot be used in the cylinder at a low temperature the pistons run dry and are consequently subjected to high abrasion.

The use of piston rings has not solved this problem from various reasons; therefore the only way to eliminate these difficulties was to operate the piston in the cylinder with a minimum play of about 0.02 to 0.03 millimeter in order to reduce during the working stroke the back flow of liquid from the pressure side.

Moreover, and in view of the lubricant-free operation of the pumps, it is necessary to accurately machine the surface of the cylinder and piston; therefore abrasion of the piston and cylinder faces is greatly increased by the canting of the piston and the thus produced one-sided pressure.

It is the main object of the invention to eliminate the above described disadvantages of pumping liquefied gases and to obtain during the pumping of the same in spite of absence of lubricants a practically abrasion-free operation of the piston and the cylinder.

With these and other objects in view which will become apparent as this specification proceeds, the invention will now be described more in detail and with reference to the accompanying drawings.

Figure 2:
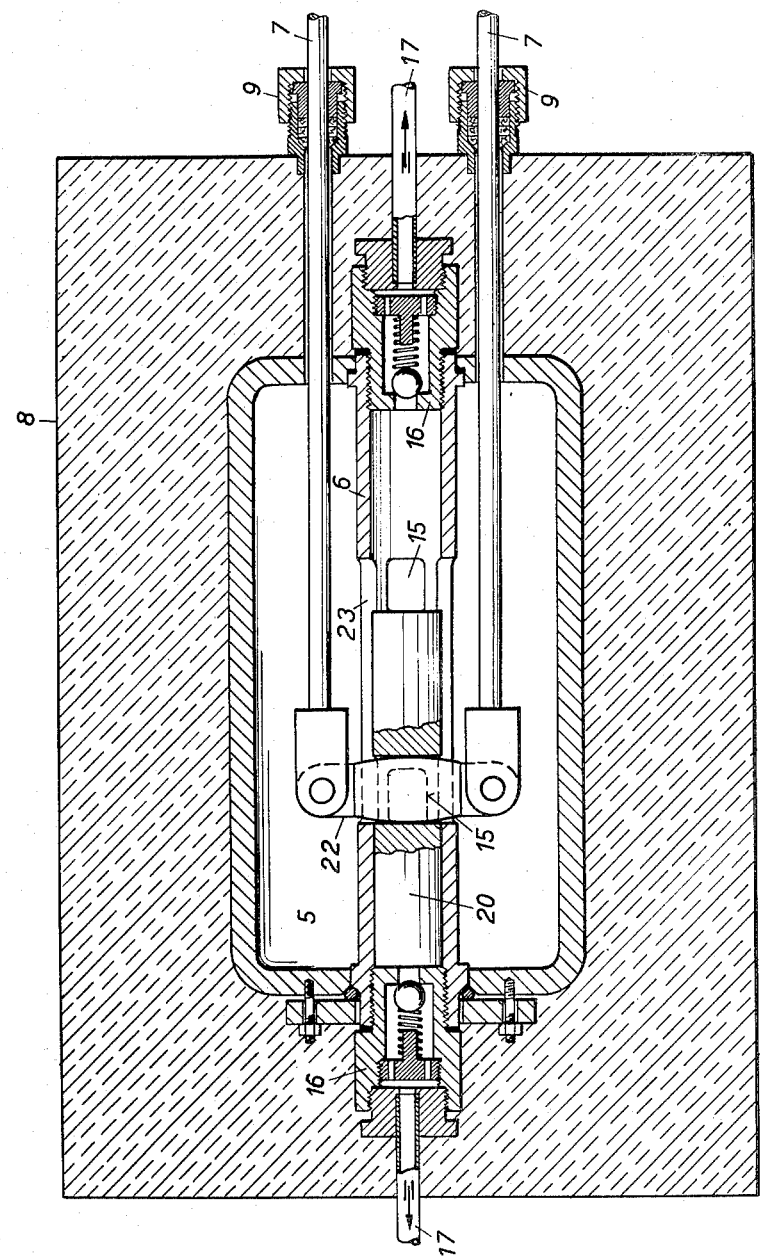

In the drawings,

Figure 1 is a vertical sectional view of a double action pump installation for use in the transport of liquids and particularly liquefied gases, and Figure 2 is a horizontal sectional view on line 2—2 of Figure 1.

The liquid to be transported by the instant pumping installation flows from a supply tank 1 through tube 25, which is provided with a valve 3, and through tube 4 into a chamber 5 which is surrounded by an insulating casing 8; also the other above recited parts of the pumping device are insulated, the insulation being denoted by cross lines.

The pump cylinder 6 is supported in opposite side walls of chamber 5. Two parallel piston rods 7 laterally spaced from the cylinder and operatively connected with piston 20 extend outwardly from chamber 5 through the insulating casing 8.

The piston rods 7 which are laterally spaced from cylinder 6, are freely mounted for reciprocation and are sealed at the exit from chamber 5 by low pressure parking boxes 9 which are attached to the outside wall of the casing 8. The outer ends of the two parallel piston rods 7 are connected with cross-head 10 of a gear device 11, which is driven by motor 12. The inner ends of the rods 7 are connected with the piston 20.

The piston 20 located in the cylinder 6 has an opening which extends transversely to its longitudinal axis; a cross bar which is connected with the two piston rods and transmits the to and fro movement of the rods to the piston 20 extends through said opening. This cross bar is at its thrust faces spherically shaped relative to the piston 20. By this formation of the thrust faces of the cross bar the measure variations of the piston rods are equalized in such a manner that they do not act as lateral forces onto the piston 20; consequently, only the forces moving to and fro parallel with the cylinder axis are transmitted and none of the lateral forces which may lead to the canting of the piston.

A tube 13 leads from the upper portion of chamber 5 to the upper part of the supply vessel 1; a safety valve 24 and a shut-off valve 14 are placed in this tube.

If valve 14 is opened the vapors originating from the evaporation of the liquid by the influence of the surrounding atmosphere flow from chamber 5 through tube 13 into supply vessel 1; the same is true of those vapors which are produced by evaporation during the return stroke of piston 20, Figure 2, and during the supply of fresh liquid into the cylinder 6.

The liquid in the supply vessel 1 and in the chamber 5 is in mutual communication through tube 13; the cylinder 6 is constantly surrounded by this liquid, if the upper side of the pump cylinder 6 is located underneath the bottom of supply vessel 1.

The liquid to be pumped is supplied through the slots 15 into the pump cylinder 6; it is discharged through the non-return valves 16 located in the end portions of the pump cylinder 6 into conduits 17, hence through the non-return valve 19 into the conduit 18 and finally into suitable receiver vessels, not shown.

It is apparent from the above that the invention relates to a double action pump which has its piston rods 7 positioned outside of the operative space of the pump cylinder 6. The piston rods 7 are freely mounted for reciprocation and are sealed at the exit from casing 8 by low-pressure packing boxes 9, which seal the chamber 5 against the surrounding atmosphere.

Piston 20 located in cylinder 6 has an opening for the reception of the cross bar 22, which at its thrust faces is spherically shaped relative to piston 20. In this manner an assurance is obtained that the piston 20 will move in cylinder 6 practically without one-sided pressure and with a minimum of cant.

It is a particular advantage of the invention that the inevitable flow-in of heat from the surrounding atmosphere through the piston rods does not pass into the cylinder and the piston, which would create a reduction of the pumping efficiency, but is taken up by the fluid in chamber 5.

The invention is described for use with double action pumps; however, it may be also used in connection with other pumps, for instance, those, which instead of inlet slots are provided with inlet valves.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. In a double action installation for pumping liquefied gases, an insulated outer casing, a cylindrical casing surrounded by that insulated casing to hold the liquefied gases, a pump cylinder extending along the center axis of said cylindrical casing, a piston displaceably located in said pump cylinder, slots in said pump cylinder connecting said cylindrical casing and said pump cylinder, a cross bar oscillatingly located in said piston and extending with its ends through said slots, said cross bar being spherically shaped at its thrust faces with said piston, two piston rods in said cylindrical casing and connected with the ends of said cross bar.

2. In a double action installation according to claim 1, said piston rods extending from said cylindrical casing through said insulated casing, low pressure packing boxes to seal said cylindrical casing against the surrounding atmosphere at the places, where said piston rods exist from said insulated casing, said packing boxes being located on the exterior side of said insulated casing.

References Cited in the file of this patent

UNITED STATES PATENTS

| | | |
|---|---|---|
| Re. 19,054 | Heylandt | Jan. 16, 1934 |
| 304,670 | Ruppelt | Sept. 2, 1884 |
| 1,001,667 | McIntyre | Aug. 29, 1911 |
| 1,568,147 | Fischbacher | Jan. 5, 1926 |
| 1,878,317 | Picard | Sept. 20, 1932 |
| 2,292,375 | Hansen | Aug. 11, 1942 |